US008719002B2

(12) United States Patent
Best et al.

(10) Patent No.: US 8,719,002 B2
(45) Date of Patent: May 6, 2014

(54) REVISING CONTENT TRANSLATIONS USING SHARED TRANSLATION DATABASES

(75) Inventors: Steven Francis Best, Acton, MA (US); Robert James Eggers, Jr., Austin, TX (US); Janice Marie Girouard, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 12/354,013

(22) Filed: Jan. 15, 2009

(65) Prior Publication Data

US 2010/0179802 A1 Jul. 15, 2010

(51) Int. Cl.
*G06F 17/28* (2006.01)
(52) U.S. Cl.
USPC ............. 704/2; 704/4; 704/7; 704/8; 705/51; 705/54; 705/59
(58) Field of Classification Search
USPC ....................... 704/1–9; 705/50–59
See application file for complete search history.

(56) References Cited

U.S. PATENT DOCUMENTS

| 6,278,969 | B1 | 8/2001 | King et al. | |
|---|---|---|---|---|
| 6,345,244 | B1 * | 2/2002 | Clark | 704/2 |
| 6,857,022 | B1 * | 2/2005 | Scanlan | 709/229 |
| 2003/0009320 | A1 * | 1/2003 | Furuta | 704/2 |
| 2003/0120478 | A1 * | 6/2003 | Palmquist | 704/3 |
| 2005/0091216 | A1 * | 4/2005 | Kranz et al. | 707/10 |
| 2007/0092859 | A1 * | 4/2007 | Watts et al. | 434/322 |
| 2008/0086307 | A1 * | 4/2008 | Okayama et al. | 704/260 |
| 2008/0288240 | A1 * | 11/2008 | D'Agostini | 704/3 |

FOREIGN PATENT DOCUMENTS

| JP | 63264167 A | 10/1988 |
|---|---|---|
| JP | 405101095 A | 4/1993 |
| JP | 08194710 A | 7/1996 |
| JP | 10097536 A | 4/1998 |
| JP | 10134056 A | 5/1998 |
| WO | 9957651 A1 | 11/1999 |

OTHER PUBLICATIONS

U.S. Appl. No. 12/037,177, System, Method and Computer Program Product for Providing a Shared Memory Translation Facility, D. Greiner et al, filed Feb. 26, 2008 (not yet published).

* cited by examiner

*Primary Examiner* — Shaun Roberts
(74) *Attorney, Agent, or Firm* — Garg Law Firm, PLLC; Rakesh Garg; Steven Bennett

(57) ABSTRACT

A method, system, and computer usable program product for revising content translations using shared translation databases are provided in the illustrative embodiments. A translation of some content is presented to a user. A revision to a first portion of the translation is received from the user. A second portion of the translation is identified using the shared translation database, the second portion being a candidate for revising using the revision. The second portion is suggested for revision. The second portion may be identified without user interaction. The revision may be submitted for review along with user-selected portions, and an approval may be received. The user's access to the shared translation database may be controlled such that the user is able to interact with the shared translation database to identify the second portion but the user may be unable to modify the shared translation database.

20 Claims, 5 Drawing Sheets

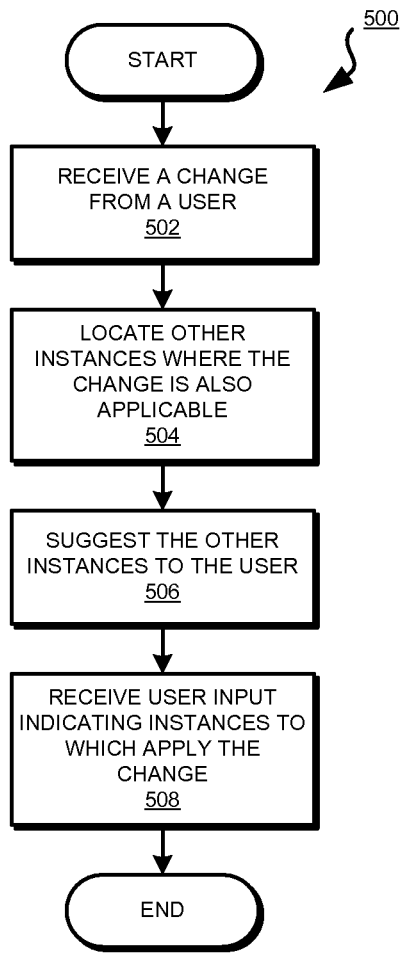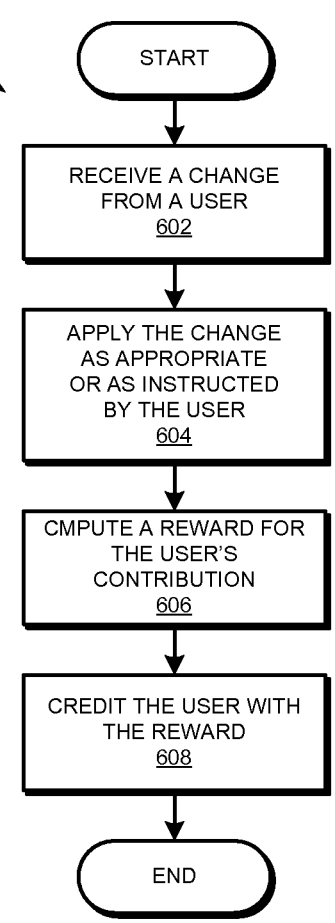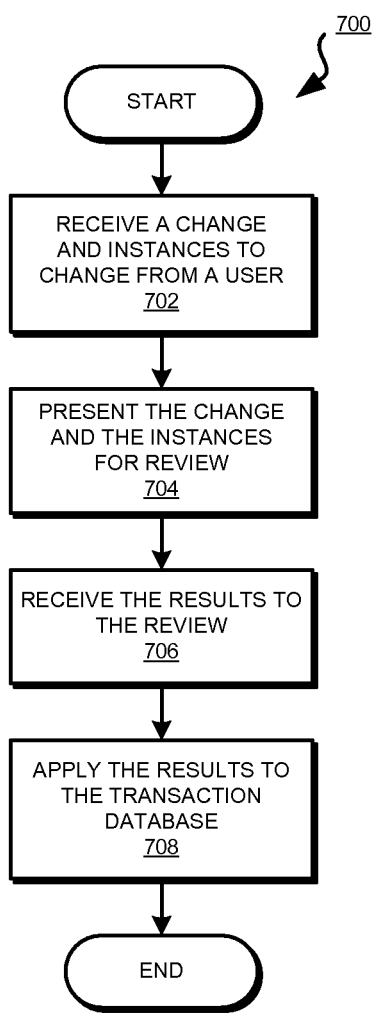

REVISING CONTENT TRANSLATIONS USING SHARED TRANSLATION DATABASES

BACKGROUND OF THE INVENTION

1. Field of the Invention

The present invention relates generally to an improved data processing system, and in particular, to a computer implemented method for managing text translations. Still more particularly, the present invention relates to a computer implemented method, system, and computer usable program code for revising content translations using shared translation databases.

2. Description of the Related Art

Many types of books, publications, and other documents are available to users in electronic form. Making documents available in electronic form, such as over a data network, allows users of those documents easy access to those documents. Publishers of those documents also find it cost effective and easier to distribute the documents to their target audience.

Often, a need exists for translating books, publications, and other documents from an original language to one or more other languages. An original language or a source language of a document is a language in which an author created the original content of the document. Other language or a target language of a document is a language to which the original content of the document is translated, such as for users of that target language.

Presently, many documents that are available in electronic form are available in a variety of languages. Presently, a user of particular language can receive the contents of a document in that language provided the publisher of that document has created a translation of the document in that language. Users of different languages can similarly access different translations of a common document over a data network.

Presently, for providing translated documents, publishers maintain one or more translation database to provide translations of a document in desired one or more target languages. A translated document is a document whose content is a target language translation of an original content. A translation database is a data structure that contains translations of words or phrases from a source language to a target language. A translation memory is a type of translation database used in the electronic publishing industry.

SUMMARY OF THE INVENTION

The illustrative embodiments provide a method, system, and computer usable program product for revising content translations using shared translation databases. A translation of some content is presented to a user. A revision to a first portion of the translation is received from the user. A second portion of the translation is identified using the shared translation database, the second portion being a candidate for revising using the revision. The second portion is suggested for revision.

In one embodiment, the second portion may be identified without user interaction. Further, suggesting the second portion may include suggesting to the user, suggesting to a reviewing authority, or suggesting to a combination of the user and the reviewing authority.

In another embodiment, the first and the second portions collectively form instances. Additionally, an input may be received from the user, the input corresponding to a selection of an instance from the instances.

In another embodiment, the revision may be submitted along with submitting the first portion, the second portion, or a combination of the first and the second portions, for review. An approval may be received for revising the first portion, the second portion, or a combination of the first and the second portions, according to the revision. The shared translation database may be revised according to the approval. In another embodiment, receiving the approval may include receiving a substitute revision.

In another embodiment, the user's access to the shared translation database may be controlled such that the user is able to suggest the revision, interact with the shared translation database to identify the second portion, or select the second portion for revising. However, the user may be unable to modify the shared translation database.

In another embodiment, the translation may be a first translation. a third portion may be located, the third portion being a candidate for revising based on the revision. The third portion may be in a second translation in the shared translation database. The third portion may be suggested for revision to a reviewing authority.

In another embodiment, the first translation may be a translation of an original content in a first language, and the second translation is a translation of an original content in a second language. Further, the first and the second translations may be distinct from one another. Additionally, the first translation may be stored in the shared translation database and the second translation may be stored in a second translation database.

In another embodiment, a reward corresponding to the revision may be computed. The user may be credited with the reward.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 5 depicts a flowchart of a process of correlating instances of content for revision in accordance with an illustrative embodiment;

FIG. 6 depicts a flowchart of a process of rewarding a user for contributing revisions in accordance with an illustrative embodiment;

FIG. 7 depicts a flowchart of a review and approval process for revisions according to an illustrative embodiment.

DETAILED DESCRIPTION OF THE PREFERRED EMBODIMENT

Figure 1:
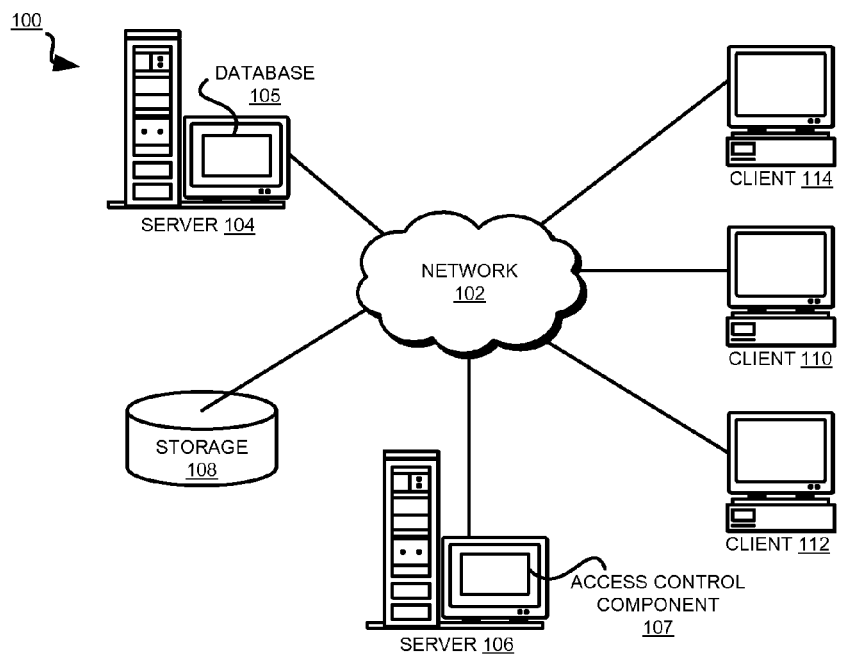
FIG. 1 depicts a pictorial representation of a network of data processing systems in which illustrative embodiments may be implemented.

The illustrative embodiments recognize that a publisher may use certain translators for creating translations of content into various languages. A translator may be a person who is skilled in a particular language, or a system or software programmed to translate input content to a particular language.

The illustrative embodiments further recognize that a publisher's intellectual property, such as copyright, lies in not only the original content in the source language but also the translations of that content in target languages. Thus, the illustrative embodiments recognize that a publisher may find it desirable to maintain control over the translation databases that provide translated content in electronic form to the users.

The illustrative embodiments further recognize that content is not just a collection of words, phrases, or symbols, but also an expression of thoughts and ideas. A translation of content has to not only translate the words, phrases, or symbols, but also convey the thought or idea of the content accurately.

The illustrative embodiments recognize that a translation may not be accurate as provided by a translator, as stored in a translation database, or as used by a user. For example, a translation of a phrase in an original content written in English may be translated differently in Spanish as used by a user in Spain and Spanish as used by a user in Latin America. As another example, a phrase in one language may be socially acceptable, but if translated word for word into a different language may be socially offensive. In such circumstances, an accurate translation would not be a verbatim translation but a translation of an idea conveyed by the phrase in the first language.

Many translations, although available from the publisher, may not be accurate. The illustrative embodiments further recognize that users of particular languages are often able to identify inaccuracies in translations in those languages that are created by translators.

However, the illustrative embodiments recognize that presently, a user who identifies an inaccuracy in a translation has limited options to communicate the inaccuracy, contribute a revision, or both, to the publisher. Presently, a user has to email the inaccuracy and a suggested revision to the publisher, or complete an online form that results in a similar communication to the publisher. The user has to repeat this process for each inaccuracy the user identifies in the translated document.

The illustrative embodiments further recognize that an inaccuracy may manifest itself in several places in a given translated document. Further, the inaccuracy may manifest itself in numerous instances across many documents. For example, while creating a users-manual for a particular model of a particular make of an automobile, an author may create approximately fifty percent of content from already existing content of other user-manuals. Furthermore, on average, approximately forty three percent of a document may comprise sentences, phrases, and words that are repeated. Approximately twenty percent of the text in a given document may have been already translated in another language in same or different context.

Presently, a user has to communicate each inaccuracy and a suggested revision to the publisher, such as by email or web-forms. The publisher has to consider each suggestion in isolation from the other suggestions. This process of suggesting revisions is inefficient for both the user and the publisher.

To address these and other problems associated with revising translated content, the illustrative embodiments provide for revising content translations using shared translation databases. Translation databases, such as a translation memory, are tools that facilitate translation of content. A feature of some translation databases is that once a phrase or word has been translated once, the translation can be reused for each recurrence of the word or phrase in same or different document.

A translation database according to the illustrative embodiments may include translation of any type of content, such as text, images, icons, symbols, or other audio visual content, from one language to another. Furthermore, a translation database of the illustrative embodiment may contain translation for one or more single target languages. Additionally, the translation database may be one or more databases. A database of a translation database may be a relational database, an object oriented database, a flat file, an index file, a data structure in memory, or any other data structure suitable for storing data.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular technologies or data processing environments only as an example for the clarity of the description. The illustrative embodiments may be used in conjunction with other comparable or similarly purposed architectures.

Figure 2:
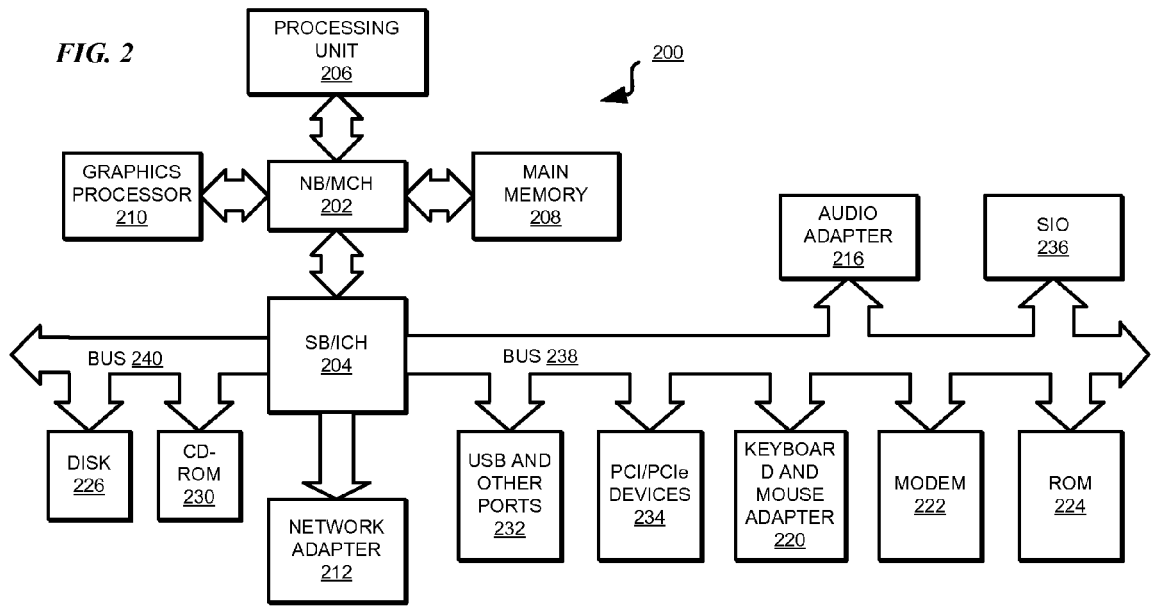
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. Server 104 may have database 105 executing thereon. Database 105 may be a translation database, such as a translation memory application. Server 106 may have access control component 107 executing thereon. Access control component 107 may be an application or a component thereof that may manage access to data processing systems and applications available over network 102. For example, access control component 107 may control which users may access database 105 on server 104.

In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
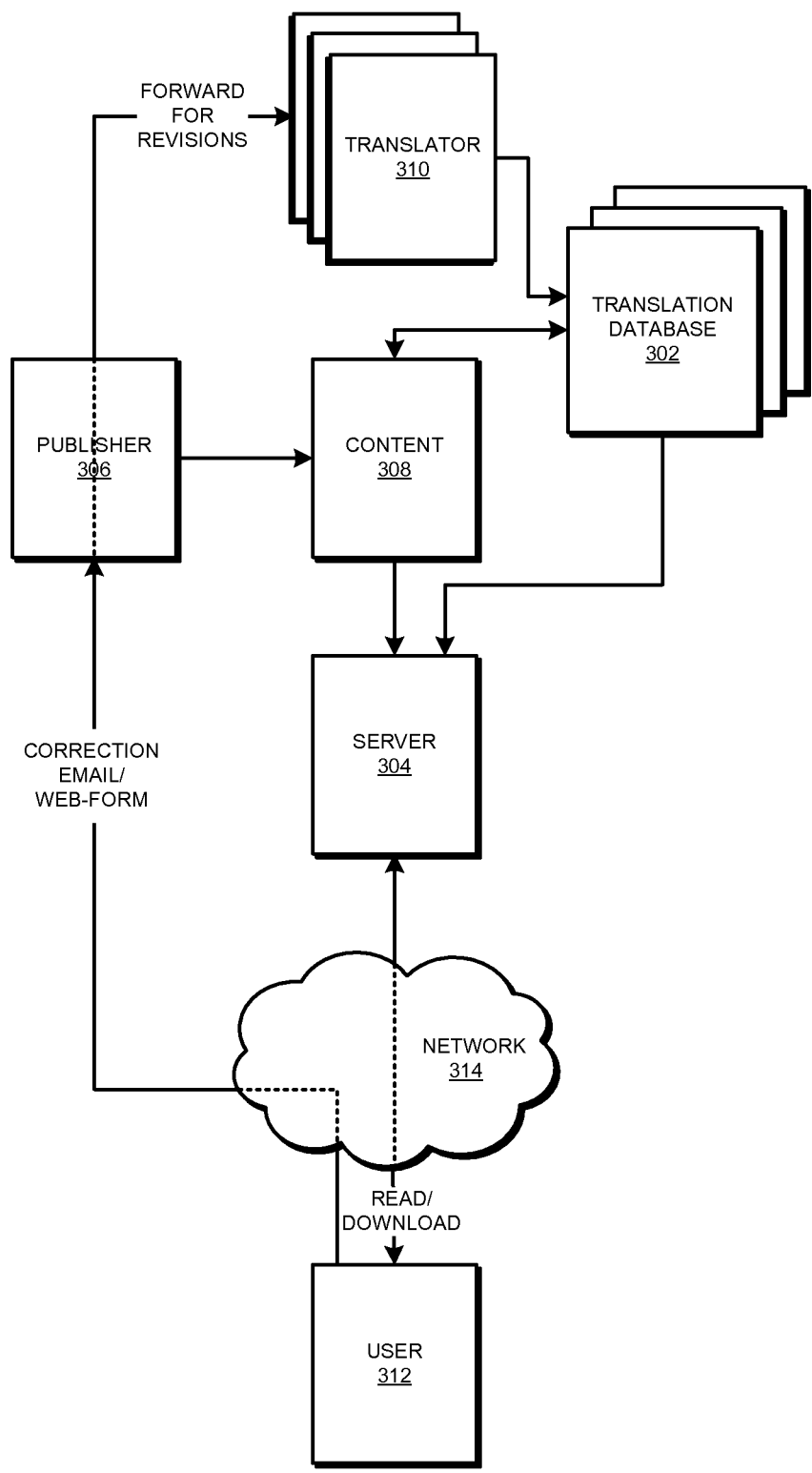
FIG. 3 depicts a block diagram of an example configuration of a translation database that may be adapted to revise translated content according to an illustrative embodiment.

With reference to FIG. 3, this figure depicts a block diagram of an example configuration of a translation database that may be adapted to revise translated content according to an illustrative embodiment. Translation database 302 may be implemented using database 105 in FIG. 1. Server 304 may be any data processing system depicted in FIG. 1, such as server 104, server 106, client 110, client 112, or client 114.

Translation database 302 may be a set of translation databases. A set of translation databases is one or more translation databases. For example, translation database 302 or a part of translation database 302 may store translations of portions of text in one language. Translation database 302 or another part of translation database 302 may store translations of portions of text in a different language.

Publisher 306 may be a data processing system, such as a laptop computer of a person in the publishing business. Publisher 306 may provide, maintain, manage, control, or have rights to content 308. Content 308 may be the content of a set of documents. A set of documents in one or more documents.

Content 308 may be any type of content. For example, content 308 may be text, symbols, images, audio recordings, video recordings, or any combination thereof.

Translator 310 may be a set of translators that may provide translations to translation database 302. A set of translators is one or more translators. According to an illustrative embodiment a translator in translator 310 may provide translation in a specific language. According to an illustrative embodiment, translator 310 may include several translators providing translation in a single language. According to another illustrative embodiment, translator 310 may include one translator providing translation in several languages.

Furthermore, some translators may provide translation services for certain type and subject matter of content 308. For example, a translator may be capable of translating from English to French, but may be capable of performing that translation for general newsworthy content but not content pertaining to science or technology.

Translator 310 provides, controls, manipulates, or manages the data in translation database 302. The ownership and intellectual property rights to the data in translation database 302 may or may not be subject to translator 310's control.

Translation database 302 correlates the data contained therein with content 308. For example, in one embodiment, translation database 302 may store English to French translation of a set of words, phrases, and sections of text. In correlating this content to a particular embodiment of content 308, translation database 302 may identify all occurrences of a subset of those words, phrases, and sections of text in content 308. Each such occurrence is called an instance. For example, each occurrence of the word "for" in content 308 is an instance of the word "for" in content 308.

User 312 may access a translation of content 308 over network 314. For example, content 308 may be a user's manual for a device, and user 312 may wish to download or read that manual in French.

Server 304, using a software application, may combine content 308 and data in translation database 302 to result in a translated content requested by user 312. Server 304 may serve the translated content over network 314.

When user 312 identifies an inaccuracy in the translated content, user 312 may wish to have the translation revised to remove the inaccuracy. User 312 may email publisher 306, or complete a web-form to notify publisher 306 of the inaccuracy. User 312 may also suggest a correction in such communication. Depending on publisher 306's review and approval of such revisions, publisher 306 may have translator 310 perform the revision to translation database 302.

Presently, user 312 has these email and web-forms alternatives for correcting inaccurate translations. Publisher 306 does not presently wish to expose translation database 302 to user 312 due to the risk of losing publisher 306's intellectual property.

Other technologies for user contribution, such as Wiki websites, allow users to make changes directly but suffer from other disadvantages. For example, a wiki website does not correlate instances of a phrase in a particular document or documents available at the website. A user who contributes a correction, revision, or a new piece of information, contributes it for use at a specific location in the wiki website. That user-contribution is not propagated to other locations, instances, where the user-contributed revision may be similarly applicable. The user has to input the user provided revision at each such instance separately.

As another example, wiki technology allows a user to make revisions without a revision review process. Generally, when a website employs wiki technology, a user is either completely restricted out of certain areas of the website or completely free to contribute whatever the user wishes. This all or nothing scheme of wiki websites does not make room for reviewed revisions. Lack of review and approval before a user contributed revision affects the content causes a lack of credibility of the content provided by the wiki websites.

Figure 4:
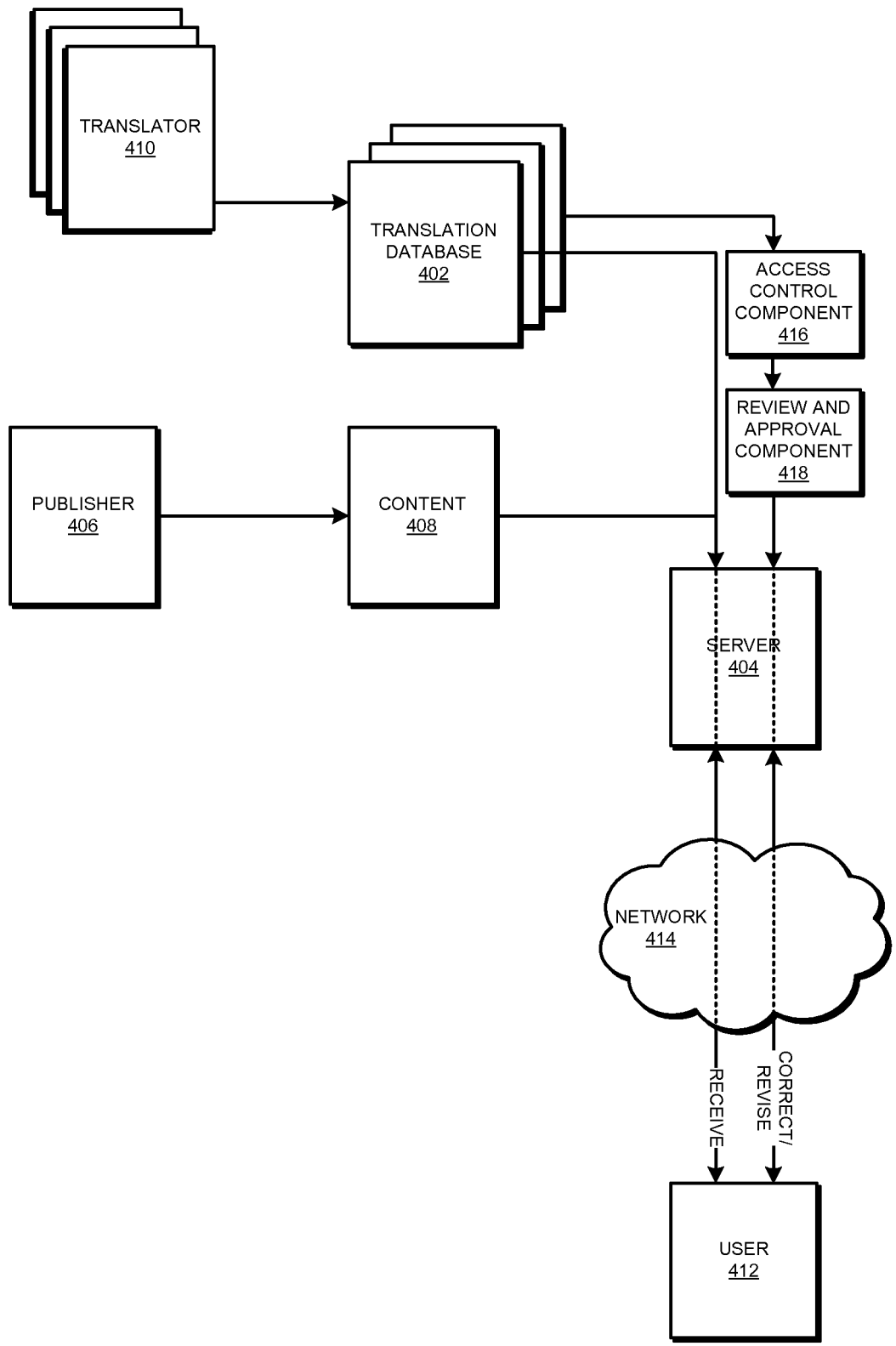
FIG. 4 depicts a block diagram of an example configuration for revising a translation database according to an illustrative embodiment.

With reference to FIG. 4, this figure depicts a block diagram of an example configuration for revising a translation database according to an illustrative embodiment. Translation database 402 may be similar to translation database 302 in FIG. 3. Server 404 may be implemented using server 304 in FIG. 3. Publisher 406 may be analogous to publisher 306, content 408 may be analogous to content 308, and translator 410 may be analogous to translator 310 in FIG. 3 respectively.

In accordance with an illustrative embodiment, user 412 may receive or download translated content from server 404 over network 414. Translated content may be created using content 408 and translation database 402 in the manner described with respect to FIG. 3.

In addition, user 412 may have access to translation database 402 in order to contribute corrections or revisions to the translation stored therein. Access control component 416 may limit, monitor, grant, deny, or otherwise manipulate user 412's access to translation database 402, such that publisher 406's intellectual property residing in translation database 402, content 408, and any other material is not compromised.

Any existing access control mechanism may be utilized for implementing access control component 416. For example, a user identifier (user ID) and password based access control may allow a user with a certain user ID access to only a certain language translation, a certain set of documents, a certain portion of a document, certain types of subject matter of content, translations of a certain type of content, or some combination thereof. As another example, any user may be allowed to contribute to certain translations whereas certain portions of the data in translation database 402 may require pre-approved access permission. Of course, the specific access controls and methods thereof are only described here as examples and are not limiting on the illustrative embodiments. Many other access control schemes may be apparent from this disclosure and the same are contemplated within the scope of the illustrative embodiments.

Review and approval component 418 may intercept user 412's contributions and subject them to a pre-determined review and approval process. In other words, while user 412 may have visibility and access to translation database 402 to provide corrections or revisions, user 412's contributions may not become a part of translation database 402 without someone's review and/or approval. For example, review and approval component 418 may redirect user 412's contributions to publisher 406 for review and approval. Alternatively, as another example, review and approval component 418 may redirect user 412's contributions to translator 410 for review and publisher 406 for approval.

Any other entity, depicted or not depicted in FIG. 4, may participate in review and approval process. For example, a scholar in a particular subject matter may receive user 412's contributions for review and approval through review and approval component 418.

As another example, review and approval component 418 may itself review and approve certain user contributions. For example, certain pre-configured rules in review and approval component 418 may permit or reject certain contributions from user 412 to revise translation database 402. As another example, review and approval component 418 may utilize a lexicon or a thesaurus to verify the accuracy of the user provided revision.

Furthermore, certain contributions, certain users, or contributions of certain users, may be allowed to bypass access control component 416. Similarly, certain contributions, certain users, or contributions of certain users, may be allowed to bypass review and approval component 418. For example, a spelling mistake correction contributed by user 412 can be easily verified using a dictionary. Publisher 406 may desire such revisions to become a part of translation database 402 as soon as possible and without extensive review or approval.

In one embodiment, access control component 416, review and approval component 418, or both components 416 and 418 may be combined with translation database 402. For example, components 416 and 418 may be implemented as software code that is utilized or executed by other software code of translation database 402.

With reference to FIG. 5, this figure depicts a flowchart of a process of correlating instances of content for revision in accordance with an illustrative embodiment. Process 500 may be implemented in a translation database, such as translation database 402 in FIG. 4.

Process 500 begins by receiving a change suggestion from a user (step 502). A change suggestion may be a suggestion by a user to change, revise, or correct a translation existing in the translation database.

Process 500 locates other instances of content where the suggested change is also applicable (step 504). Locating other instances of content may be implemented by searching an original text content, using a data structure in a translation database to locate sections that may be translated similarly to the section where the user has suggested the change, or any other method suitable for a particular implementation.

Process 500 suggests the other instances from step 504 to the user (step 506). In one embodiment, step 506 may be omitted. In another embodiment, step 506 may not suggest the instances to the user but adopt the user suggested change of step 502 automatically for some or all of the other instances.

Process 500 receives one or more user inputs indicating which instances should be changed as suggested in step 502 (step 508). Process 500 ends thereafter. A user may indicate the selection of instances to be changed in any manner suitable for a particular implementation. For example, a user may be presented with a list of checkboxes, each checkbox representing an instance, and the user may check zero or more checkboxes. As another example, a display of the translated content may include highlighted instances that can be changed as suggested, and the user can select zero or more highlighted instances.

With reference to FIG. 6, this figure depicts a flowchart of a process of rewarding a user for contributing revisions in accordance with an illustrative embodiment. Process 600 may be implemented in a translation database, such as translation database in FIG. 4. Process 600 may also be implemented in another application, such as a software application executing on or accessible to server 404 in FIG. 4.

Process 600 begins by receiving a change suggestion from a user (step 602). Step 602 may be implemented similar to step 502 in FIG. 5. Process 600 may apply the suggested change based on a determination of appropriateness of the change or an instruction of the user (step 604). For example, process 600 may apply the change if a publisher approves the change as an appropriate change. As another example, process 600 may apply the change if the change has already been reviewed and approved and the user has instructed to apply the same change to other instances.

Process 600 computes a reward for the user's contribution (step 606). When users contribute to a publisher's intellectual property, the publisher may decide to implement a reward system to encourage the users to contribute more revisions in the future. A reward for user contributions may be any reward suitable for a particular implementation. For example, in one embodiment, a user may collect points for the user's contributions, the points being redeemable for merchandise or services. In another embodiment, a user may receive accumulate discounts on merchandise or services for the user's contributions. In another embodiment, the user may receive a cash reward for the user's contributions. These reward configurations are only some examples of the reward system of process 600 and are not intended to be limiting on the illustrative embodiments. Many other methods of computing and awarding rewards for user contributions will be apparent from this disclosure.

Process 600 credits the user with the reward computed in step 606 (step 608). Process 600 ends thereafter.

With reference to FIG. 7, this figure depicts a flowchart of a review and approval process for revisions according to an illustrative embodiment. Process 700 may be implemented in review and approval component 418 in FIG. 4.

Process 700 begins by receiving a change and an instruction selecting the instances to revise from the user (step 702). Process 700 may receive the changes or revisions from the user in a manner similar to step 502 in FIG. 5 or step 602 in FIG. 6. Process 700 may receive an instruction about which instances to change in a manner similar to step 508 in process 500.

Process 700 presents the change and the selected instances for review (step 704). As an example, process 700 may present the user suggested change and the instances where the change may be applicable to a publisher or another authority for review.

Process 700 receives the results of the review (step 706). In one embodiment, the results of step 706 may be in the form of an approval or rejection of the change. In another embodiment, the results may include approval or rejection of the applicability of the change to certain instances. In another embodiment, the results may include a suggested modification to the user-suggested change. In some embodiments, results of step 706 may be available to process 700 while the user is interacting with process 700. In other embodiments, results of step 706 may occur sometime after the user has provided the revisions, asynchronously with the user's inputs.

Process 700 may apply the results to the translation database (step 708). Process 700 ends thereafter. For example, if the results of step 706 include an approval for revising some instances, process 700 revises those instances in the translation database in step 708. If none of the revisions is approved for none of the instances, process 700 applies those results by leaving the translation database unchanged.

Figure 8:
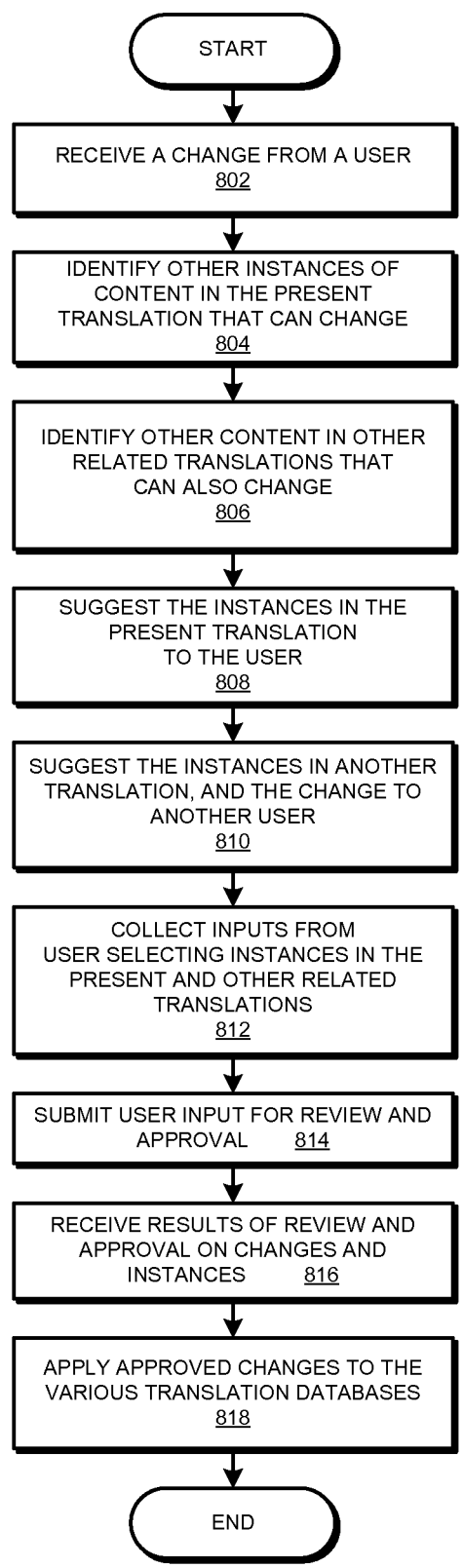
FIG. 8 depicts a flowchart of a process of propagating a user suggested change across documents and translations in accordance with an illustrative embodiment.

With reference to FIG. 8, this figure depicts a flowchart of a process of propagating a user suggested change across documents and translations in accordance with an illustrative embodiment. Process 800 may be implemented in translation database 402 in FIG. 4.

Process 800 begins by receiving a change from a user (step 802). Process 800 identifies other instances in the translated content that the user is using that can also change according to the user-suggested change (step 804).

Process 800 may also identify content in other translations that can also benefit from the user-suggested change (step 806). For example, an original text in English language may have been translated in Mandarin. Subsequently, the Mandarin translation may have been used to create a Cantonese translation. If a user suggests a change to the Mandarin translation, process 800 may identify not only instances of the text in the Mandarin translation but also corresponding text sections of the Cantonese translation that may be revised according to the user's suggestion. In this manner, a user-suggested revision to one translation may trigger revisions in other translations of which the user may not even be aware.

Process 800 suggests other instances that may also be candidates for similar revision in the translation that the user is using (step 808). In one embodiment, process 800 may additionally suggest instances that may use the revision in translations other that the one the user may be using (step 810). In another embodiment, process 810 may identify such instances in other translations, as in step 806, but omit suggesting those instances to the user in step 810. The translations that may be subject to steps 808 and 810 may exist in one translation database or several translation databases.

Depending on the implementation of step 810, process 800 may collect user's selection of instances to be revised from the translation in use and other translations (step 812). For example, if step 810 displays instances in other translations to the user, step 812 may receive inputs for user selections in multiple translations. If, on the other hand, step 810 does not present the instances in other translations to the user, step 812 may receive user inputs selecting instances in only the translation the user may be using.

Process 800 may submit the user suggested change and the user selected instances for review and approval (step 814). In one embodiment, process 800 may send the change and the instances for a particular translation to a particular reviewing and approving authority. For example, if a user suggested revision in Mandarin translation of a text results in suggested changes to a Cantonese translation of the same text as well, process 800 may send the changes and instances in Mandarin translation to a Mandarin expert and the changes and instances in Cantonese translation to a Cantonese expert.

In another embodiment, process 800 may send all or some of the changes and instances in all or some of the translations to a common reviewing and approving authority. For example, using the above example, process 800 may send the changes and instances in both Mandarin and Cantonese translations to a single reviewing authority, such as the publisher or a translator who may be fluent in both Mandarin and Cantonese.

Process 800 may receive the results of the review and approval on the user suggested changes and instances (step 816). In one embodiment, steps 814 and 816 may be omitted in process 800 and a review and approval process may be implemented separately as described with respect to FIG. 7. In another embodiment, steps 814-816 may be implemented in process 800 such that a translation database implementing process 800 and having access to a review and approval component may execute steps 814-816 using the review and approval component.

Process 800 may apply the approved changes to the approved instances in one or more translations that may exist in one or more translation databases (step 820). Process 800 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for revising content translations using shared translation databases. Using the illustrative embodiments, a translation database, such as a translation memory, is shared with a user. The user is granted controlled access to the translation database such that the user is able to contribute revisions to the contents of the translation database.

The user's contributions may correct mistakes or inaccuracies in one or more translations of an original content. According to some illustrative embodiments, the user-suggested revisions may be subjected to review and approval before such revisions are made part of the translation database.

Furthermore, a user's suggestion in one translation may trigger suggestions of revisions in other translations. The revisions for each translation may be reviewed and approved by one or more reviewing authority. additionally, the review and approval process may be asynchronous with the user-contribution process.

According to some illustrative embodiments, a user may be rewarded for making suggestions of changes to the translated content. A reward system for contributions may be mutually beneficial for the owner of the content and the user.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for revising a translation of a content using a shared translation database, the computer implemented method comprising:
   presenting, using a processor and a memory, the translation of the content to a user;
   receiving, using the processor and the memory, a revision to a first portion of the translation from the user;
   identifying, using the processor and the memory, a second portion of the translation and a third portion of the translation using the shared translation database, the second portion and the third portion being candidates for revising using the revision; and
   suggesting, using the processor and the memory, the second portion for revising using the revision while omitting suggesting the third portion for revising using revision because only a second user with pre-approved access is allowed to revise the third portion.

2. The computer implemented method of claim 1, wherein the identifying the second portion and the third portion occurs without user interaction, wherein the suggesting the second portion is suggesting to the user wherein any user is allowed to revise the second portion.

3. The computer implemented method of claim 1, wherein the first and the second portions collectively form instances, the computer implemented method further comprising:
   receiving an input from the user, the input corresponding to a selection of an instance from the instances.

4. The computer implemented method of claim 1, further comprising:
   submitting the revision and one of (i) the first portion, (ii) the second portion, and (iii) both the first and the second portions, for review;
   receiving an approval for revising one of (i) the first portion, (ii) the second portion, and (iii) both the first and the second portions, according to the revision; and
   revising the shared translation database according to the approval.

5. The computer implemented method of claim 4, wherein receiving the approval further comprises:
   receiving a substitute revision.

6. The computer implemented method of claim 1, further comprising:
   controlling the user's access to the shared translation database such that the user is able to (i) suggest the revision, (ii) interact with the shared translation database to identify the second portion, and (iii) select the second portion for revising, but is unable to modify the shared translation database.

7. The computer implemented method of claim 1, wherein the translation is a first translation, the computer implemented method further comprising:
   locating a fourth portion, the fourth portion being a candidate for revising based on the revision, and the fourth portion being in a second translation in the shared translation database; and
   suggesting the fourth portion for revision to a reviewing authority.

8. The computer implemented method of claim 7, wherein the first translation is a translation of an original content in a first language, wherein the second translation is a translation of an original content in a second language, and wherein the first and the second translations are distinct from one another.

9. The computer implemented method of claim 8, wherein the first translation is stored in the shared translation database and the second translation is stored in a second translation database.

10. The computer implemented method of claim 1, further comprising:
    computing a reward corresponding to the revision; and
    crediting the user with the reward.

11. A computer usable program product comprising a computer usable storage device including computer usable code for revising a translation of a content using a shared translation database, the computer usable code comprising:
    computer usable code for presenting the translation of the content to a user;
    computer usable code for receiving a revision to a first portion of the translation from the user;
    computer usable code for identifying a second portion of the translation and a third portion of the translation using the shared translation database, the second portion and the third portion being candidates for revising using the revision; and
    computer usable code for suggesting the second portion for revising using the revision while omitting suggesting the third portion for revising using revision because only a second user with pre-approved access is allowed to revise the third portion.

12. The computer usable program product claim 11, wherein the identifying the second portion and the third portion occurs without user interaction, wherein the suggesting the second portion is suggesting to the user wherein any user is allowed to revise the second portion.

13. The computer usable program product of claim 11, wherein the first and the second portions collectively form instances, the computer usable program product further comprising:
- computer usable code for receiving an input from the user, the input corresponding to a selection of an instance from the instances.

14. The computer usable program product of claim 11, further comprising:
- computer usable code for submitting the revision and one of (i) the first portion, (ii) the second portion, and (iii) both the first and the second portions, for review;
- computer usable code for receiving an approval for revising one of (i) the first portion, (ii) the second portion, and (iii) both the first and the second portions, according to the revision, the computer usable code for receiving the approval further including computer usable code for receiving a substitute revision; and
- computer usable code for revising the shared translation database according to the approval.

15. The computer usable program product of claim 11, further comprising:
- computer usable code for controlling the user's access to the shared translation database such that the user is able to (i) suggest the revision, (ii) interact with the shared translation database to identify the second portion, and (iii) select the second portion for revising, but is unable to modify the shared translation database.

16. The computer usable program product of claim 11, wherein, the translation is a first translation, the computer usable program product further comprising:
- computer usable code for locating a fourth portion, the fourth portion being a candidate for revising based on the revision, and the fourth portion being in a second translation in the shared translation database, wherein the first translation is a translation of an original content in a first language, wherein the second translation is a translation of an original content in a second language, and wherein the first and the second translations are distinct from one another; and
- computer usable code for suggesting the fourth portion for revision to a reviewing authority.

17. The computer usable program product of claim 16, wherein the first translation is stored in the shared translation database and the second translation is stored in a second translation database.

18. A data processing system for revising a translation of a content using a shared translation database, the data processing system comprising:
- a storage device including a storage medium, wherein the storage device stores computer usable program code; and
- a processor, wherein the processor executes the computer usable program code, and wherein the computer usable program code comprises:
- computer usable code for presenting the translation of the content to a user;
- computer usable code for receiving a revision to a first portion of the translation from the user;
- computer usable code for identifying a second portion of the translation and a third portion of the translation using the shared translation database, the second portion and the third portion being candidates for revising using the revision, wherein the identifying the second portion and the third portion occurs without user interaction, wherein the first and the second portions collectively form instances, and wherein the computer usable code for suggesting the second portion includes computer usable code for suggesting to the user, wherein any user is allowed to revise the second portion;
- computer usable code for suggesting the second portion for revising using the revision while omitting suggesting the third portion for revising using revision because only a second user with pre-approved access is allowed to revise the third portion; and
- computer usable code for receiving an input, the input corresponding to a selection of an instance from the instances.

19. The data processing system of claim 18, further comprising:
- computer usable code for controlling the user's access to the shared translation database such that the user is able to (i) suggest the revision, (ii) interact with the shared translation database to identify the second portion, and (iii) select the second portion for revising, but is unable to modify the shared translation database;
- computer usable code for submitting the revision and one of (i) the first portion, (ii) the second portion, and (iii) both the first and the second portions, for review;
- computer usable code for receiving an approval for revising one of (i) the first portion, (ii) the second portion, and (iii) both the first and the second portions, according to the revision, the computer usable code for receiving the approval further including computer usable code for receiving a substitute revision; and
- computer usable code for revising the shared translation database according to the approval.

20. The data processing system of claim 18, wherein, the translation is a first translation, the computer usable program product further comprising:
- computer usable code for locating a fourth portion, the fourth portion being a candidate for revising based on the revision, and the fourth portion being in a second translation, wherein the first translation is a translation of an original content in a first language, wherein the second translation is a translation of an original content in a second language, and wherein the first and the second translations are distinct from one another, and wherein the first translation is stored in the shared translation database and the second translation is stored in a second translation database; and
- computer usable code for suggesting the fourth portion for revision to a reviewing authority.

* * * * *